US008786287B2

(12) United States Patent
Tabarovsky et al.

(10) Patent No.: US 8,786,287 B2
(45) Date of Patent: Jul. 22, 2014

(54) COLLOCATED TRI-AXIAL INDUCTION SENSORS WITH SEGMENTED HORIZONTAL COILS (75) Inventors: Leonty A. Tabarovsky, Cypress, TX (US); Yuliy A. Dashevsky, Novosibirsk (RU); Sergey V. Polozov, Novosibirsk (RU); Tatyana F. Polozova, legal representative, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 1034 days.

(21) Appl. No.: 12/717,000

(22) Filed: Mar. 3, 2010

(65) Prior Publication Data
US 2010/0225323 A1 Sep. 9, 2010

Related U.S. Application Data (60) Provisional application No. 61/157,260, filed on Mar. 4, 2009.

(51) Int. Cl.
*G01V 3/10* (2006.01)
(52) U.S. Cl.
USPC ........... 324/341; 324/338; 324/339; 324/340; 324/342; 343/719; 343/788
(58) Field of Classification Search
USPC ......... 324/338, 339, 340, 341, 342, 343, 344, 324/346, 356; 343/719, 788
See application file for complete search history.

(56) References Cited

U.S. PATENT DOCUMENTS

| | | | |
|---|---|---|---|
| 4,626,785 A * | 12/1986 | Hagiwara | 324/339 |
| 4,837,517 A | 6/1989 | Barber | |
| 5,138,263 A | 8/1992 | Towle | |
| 5,157,605 A | 10/1992 | Chandler et al. | |
| 5,187,661 A * | 2/1993 | Sinclair | 702/7 |
| 5,452,761 A | 9/1995 | Beard et al. | |
| 5,809,433 A | 9/1998 | Thompson et al. | |
| 5,999,883 A * | 12/1999 | Gupta et al. | 702/7 |
| 6,566,881 B2 | 5/2003 | Omeragic et al. | |
| 6,577,129 B1 | 6/2003 | Thompson et al. | |
| 6,934,635 B2 | 8/2005 | Kennedy | |
| 7,057,392 B2 | 6/2006 | Wang et al. | |
| 7,268,556 B2* | 9/2007 | Fanini et al. | 324/339 |
| 7,286,091 B2 | 10/2007 | Chen et al. | |
| 7,379,818 B2 | 5/2008 | Rabinovich et al. | |
| 7,414,407 B2 | 8/2008 | Wang et al. | |
| 2004/0017197 A1 | 1/2004 | Chen et al. | |
| 2006/0043973 A1 | 3/2006 | Chen et al. | |
| 2006/0186888 A1 | 8/2006 | Wang et al. | |
| 2008/0074336 A1 | 3/2008 | Signorelli et al. | |
| 2008/0146183 A1* | 6/2008 | Gebara et al. | 455/295 |
| 2008/0204347 A1* | 8/2008 | Alvey et al. | 343/841 |
| 2009/0256773 A1* | 10/2009 | Lindmark | 343/858 |

FOREIGN PATENT DOCUMENTS

EP 0516525 A1 12/1992
WO 2007109405 A2 9/2007

* cited by examiner

*Primary Examiner* — Jermele M Hollington
*Assistant Examiner* — Temilade S Rhodes-Vivour
(74) *Attorney, Agent, or Firm* — Mossman Kumar & Tyler PC (57) ABSTRACT

A logging tool for use in a borehole to obtain multicomponent resistivity induction measurements using collocated coils wherein each of the transverse antennas comprises a pair of mirror-image coils symmetrically disposed about an axis of the logging tool.

23 Claims, 9 Drawing Sheets

COLLOCATED TRI-AXIAL INDUCTION SENSORS WITH SEGMENTED HORIZONTAL COILS

CROSS-REFERENCES TO RELATED APPLICATIONS

This application claims priority from U.S. Provisional Patent Application Ser. No. 61/157,260 filed on Mar. 4, 2009

BACKGROUND OF THE DISCLOSURE

1. Field of the Disclosure

The present disclosure is related generally to the field of electrical resistivity well logging methods. More specifically, the disclosure is related to a method and apparatus for providing collocated coils and measuring cross-component magnetic fields in a downhole resistivity tool.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art. These eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are those layers which are typically hydrocarbon-bearing and are of the most interest to the instrument user. Some earth formations which might be of commercial interest therefore may be overlooked by interpreting a well log made using the electromagnetic induction resistivity well logging instruments known in the art.

Figure 2:
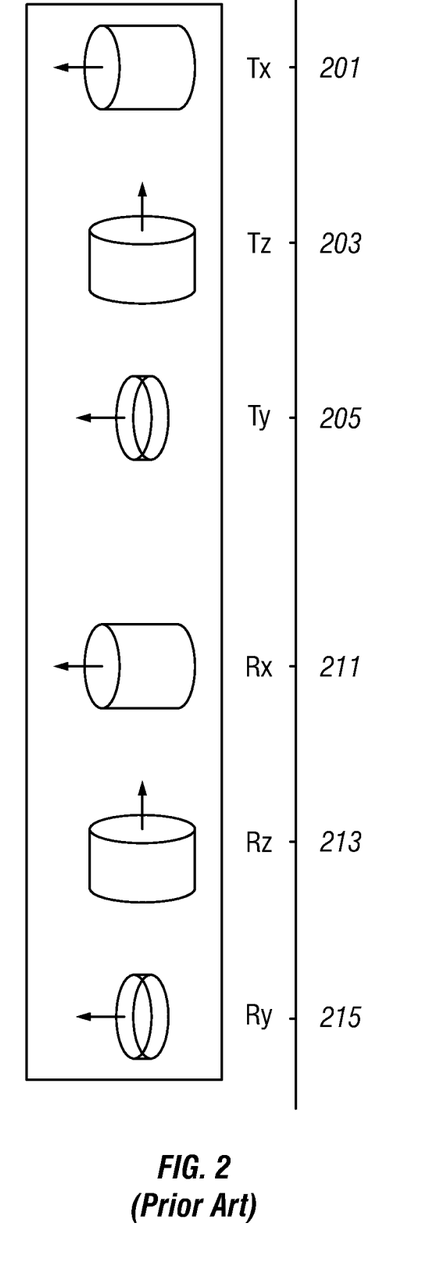
FIG. 2 (prior art) shows the transmitter and receiver configuration of a prior art multi-component logging tool.

FIG. 2 shows a configuration of transmitter coils and receiver coils in an embodiment of the 3Dexplorer (3DEX®) induction logging instrument of Baker Hughes Incorporated. Three transmitters 201, 203, and 205 that are referred to as the $T_x$, $T_z$, and $T_y$ transmitters are placed with their normals substantially orthogonal to each other, in the order shown. The three transmitters induce magnetic fields in three spatial directions. The subscripts (x, y, z) indicate an orthogonal system substantially defined by the directions of the normals to the transmitters. The z-axis is chosen to be substantially parallel to the longitudinal axis of the tool, while the x-axis and y-axis are mutually perpendicular directions lying in the plane transverse to the longitudinal axis. Also on the tool are receivers 211, 213, and 215, referred to as the $R_x$, $R_z$, and $R_y$ receivers, aligned along the orthogonal system defined by the transmitter normals. $R_x$, $R_z$, and $R_y$ are responsible for measuring the corresponding magnetic fields $H_{xx}$, $H_{zz}$, and $H_{yy}$. In this nominalization of the magnetic fields, the first index indicates the direction of the transmitter and the second index indicates the direction of the receiver.

One challenge associated with the logging instrument of FIG. 2 is that since each receiver and each transmitter are located at different axial positions, each transmitter-receiver combination has its own transmitter-receiver distance and records resistivity over different areas. Reducing these anomalies leads to improved resultant induction logs. U.S. Provisional Patent Application Ser. No. 61/020,637 of Wang et al., filed on Jan. 11, 2008, discloses collocated antenna arrangements. The teachings of Wang show the use of multiple sets of grooves in which the antenna coils are placed. This may increase the design complexity and may weaken the tool. The present disclosure provides embodiments for reducing these anomalies without using grooves.

SUMMARY OF THE DISCLOSURE

One embodiment of the disclosure is an apparatus configured to estimate a value of a resistivity property of an earth formation. The apparatus includes: a first antenna arrangement on a logging tool configured to be conveyed in a borehole, the first antenna arrangement including a first antenna and a second antenna disposed on opposite sides of the logging tool, the second antenna configured to be coupled to the first antenna to suppress a first signal caused by an axially flowing current in a conductor inside the sleeve; and a processor configured to estimate the value of the resistivity property of the earth formation using a second signal in the first antenna and the second antenna responsive to an external magnetic field Another embodiment of the disclosure is a method of estimating a value of a resistivity property of an earth formation. The method includes: conveying a logging tool into a borehole; using a first antenna arrangement on the logging tool including a first antenna and a second antenna on a side of the logging tool opposite to the first antenna for producing an output responsive to a first signal from an external magnetic field and suppressing a second signal caused by an axially flowing current in a conductor inside the sleeve; and using a processor for estimating the value of the resistivity property of the earth formation using the produced output of the antenna arrangement.

BRIEF DESCRIPTION OF THE DRAWINGS

The present disclosure is best understood with reference to the accompanying figures in which like numerals refer to like elements, and in which.

DETAILED DESCRIPTION OF THE DISCLOSURE

Figure 1:
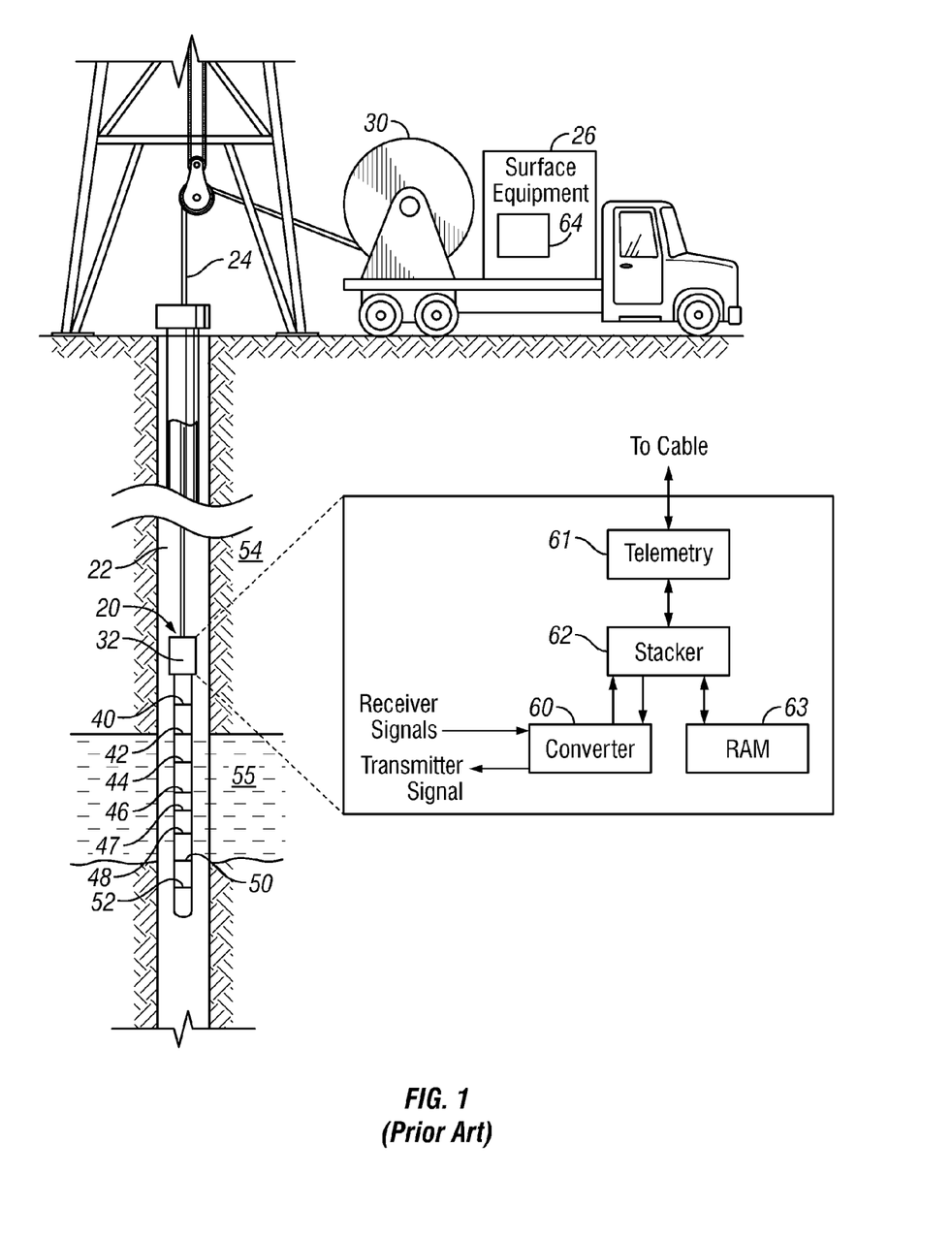
FIG. 1 (prior art) is an illustration of a wireline assembly suitable for use with the present disclosure.

Referring now to FIG. 1, an induction logging tool 20 according to the present disclosure is shown positioned in a borehole 22 penetrating earth formations 54. The tool 20, which is suspended in the borehole 22 by means of a wireline cable 24, includes electronic circuitry section 32. The tool 20 is lowered into the borehole 22 by a cable 24, which typically passes over a sheave 30 located at the surface of the borehole 22. The cable 24 is typically spooled onto a drum (not shown). The cable 24 includes insulated electric conductors for transmitting electrical signals. The electronic circuitry section 32 of the tool 20 receives signals from coils described below to perform various analog and digital functions, as will be described later.

The tool typically includes a plurality of coils 40-52. Coil 46 is a transmitter coil for transmitting an oscillating signal into the adjacent surrounding geological formation 54. Generally, a square wave signal is supplied to the coil 46. However, it is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46 which in turn generates an electromagnetic field in the surrounding formation 54. The electromagnetic field, in turn, induces eddy currents which flow coaxially with respect to the borehole 22. The magnitudes of the eddy currents are proportional to the conductivity of the surrounding formation 54. The remaining coils 40, 42, 44, 47, 48, 50 and 52 are receiver coils in which signals are induced by the magnetic fields caused by the eddy currents produced in the formation. As the tool 20 is raised in the borehole 22, the conductivity of the surrounding formation 54 can be determined from the received signals in order that a bed or layer 55 having a conductivity indicative of the possibility of containing hydrocarbons may be located.

The electronic circuitry section 32 includes a converter circuit 60, a stacker circuit 62, a random access memory (RAM) 63, and a telemetry circuit 61. The converter circuit 60 includes a plurality of pre-amplifiers, filters, and analog-to-digital (A/D) converters for receiving signals from the receiver coils 40-44 and 47-52 and transforming them into digitized signals for further processing by the stacker circuit 62. The analog voltage signals provided by the receiver coils 40-44 and 47-52 are digitally sampled according to a predetermined sampling rate in the period defined by the fundamental frequency of the transmitter signal, which in this embodiment is approximately 10 kHz.

The sampling is repeated over a large number of transmitter voltage signal cycles, typically at least 1,024 cycles to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are stored in the RAM 63. The stacked signals corresponding to the plurality of receiver coils 40-44 and 47-52 can then be retrieved from the RAM 63 and can be transmitted by the telemetry circuit 61 through the cable 24 to a computer 64 which forms part of the surface equipment 26, where Fourier analyses of the stacked signals can be performed.

In an alternative embodiment, a microprocessor having sufficient digital signal processing capabilities may form part of the electronic circuitry section 32. Thus, it is contemplated that the required discrete Fourier transform may be performed downhole, which further reduces the amount of data to be transmitted to the surface.

Figure 3:
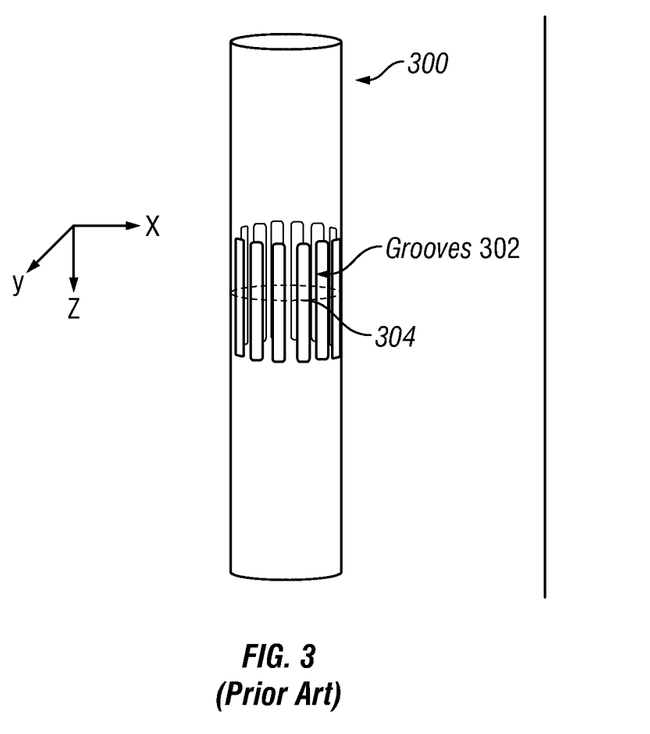
FIG. 3 (prior art) shows a conventional antenna with a z-coil and vertical grooves.

Turning now to FIG. 3, a prior art antenna arrangement for a z-coil is illustrated. In the drill collar 300, there are a plurality of vertical grooves 302. The z-coil 304 is positioned in the drill collar orthogonally to the grooves as shown. Ferrite inserts (not shown) may be provided in each of the grooves between the conducting antenna wire and the drill collar. The ferrite provides a magnetostatic shield between the antenna wires and the drill collar and serves to reduce induced currents in the drill collar. Note that the antenna arrangement shown in this figure and in the rest of the figures may be used for either a transmitter or a receiver; any exceptions will be noted.

Figure 4:
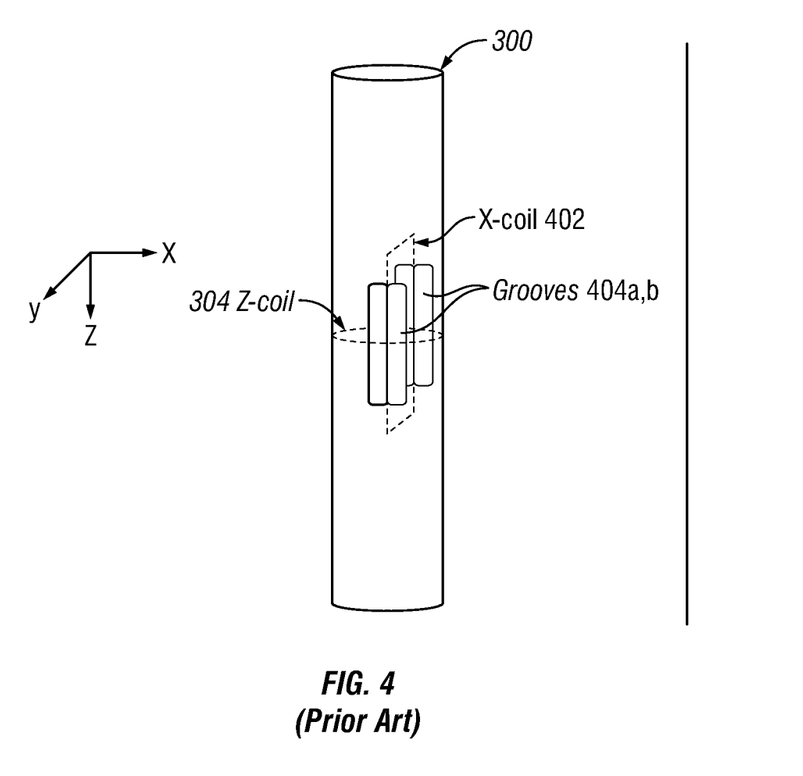
FIG. 4 (prior art) shows an antenna arrangement with z- and x-coils and two rectangular grooves.

FIG. 4 shows an arrangement from Wang in which an x-coil 402 is positioned orthogonal to the z-coil. While this is a convenient arrangement, it is not to be construed as a limitation. At least two grooves 404a, 404b must be used and positioned on opposite sides of the drill collar. The shape of the grooves may be square, rectangular, elliptical and circular. A high magnetic permeability material may be placed in some or all of the grooves. The high magnetic permeability material may be a soft ferrite material; an electrically conductive soft amorphous magnetic alloy, an electrically conductive nanocrystaline soft magnetic alloy, a stack made of soft amorphous magnetic alloy, a stack made of a nanocrystaline soft magnetic alloy, a soft iron powder containing at least one of an organic and an inorganic binder, a sendust containing at least one of an organic and an inorganic binder, and/or a nickel iron alloy powder containing at least one of an organic and an inorganic binder. Wang discloses additional designs for collocated antennas, all of which involve slots.

Figure 5:
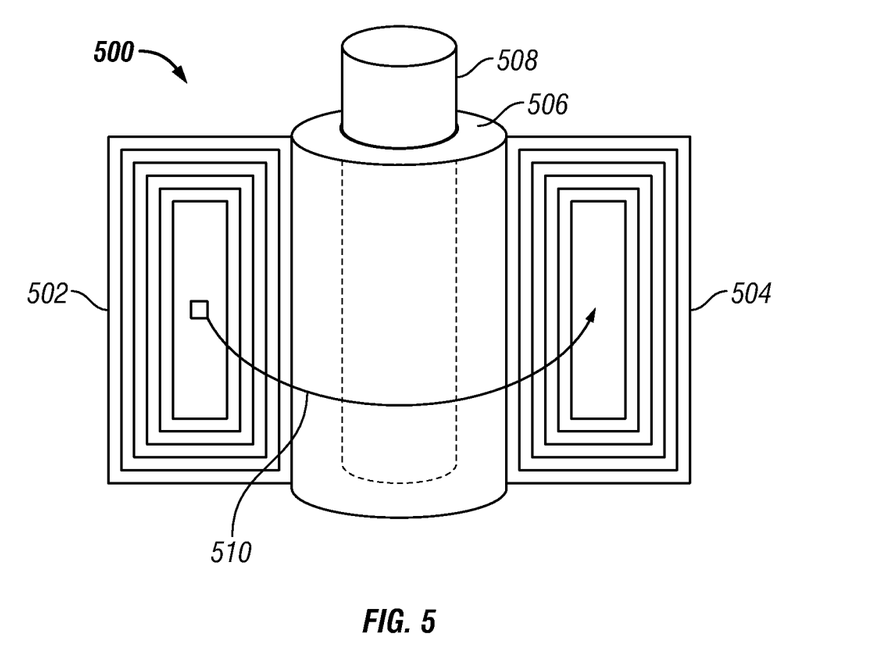
FIG. 5 shows an exemplary embodiment having transversely-oriented coils attached to an exterior of a tool member.

FIG. 5 shows an exemplary embodiment having transversely-oriented coils. For simplifying the illustration, a non-conducting pipe enclosing the coils is not shown. The coils of the exemplary embodiment may be either transmitter coils or receiver coils, although they are primarily referred to as receiver coils in the text for purposes of illustration. Tool member 500 includes planar coils 502 and 504, sleeve 506, and feed-through pipe 508. The two planar coils 502 and 504 are attached to sleeve 506 using in cuts made to the sleeve 506 and are located on opposite sides of the sleeve. An edge portion of each coil is inserted into the corresponding cut. As arranged, the normal to the plane of each segmented coil is substantially tangential to the circumference of the tool. Sleeve 506 surrounds conductive feed-through pipe 508 which has various wires and circuitry for operation of the tool member. A magnetic field 510 is produced on the outside of the tool member by currents flowing in the pipe, which are typically those currents utilized in operation of the tool member. The currents may be also produced by horizontal transmitting coils if they were asymmetrically positioned with the respect to the feed-through pipe. Since these currents typically flow longitudinally in the pipe, the resultant magnetic field is typically oriented in a circumferential direction. Thus, the magnetic field 510 intercepts the planes of each of the two coils from opposite directions, thereby giving rise to currents in each of the two coils that circulate in opposite directions.

Figure 6:
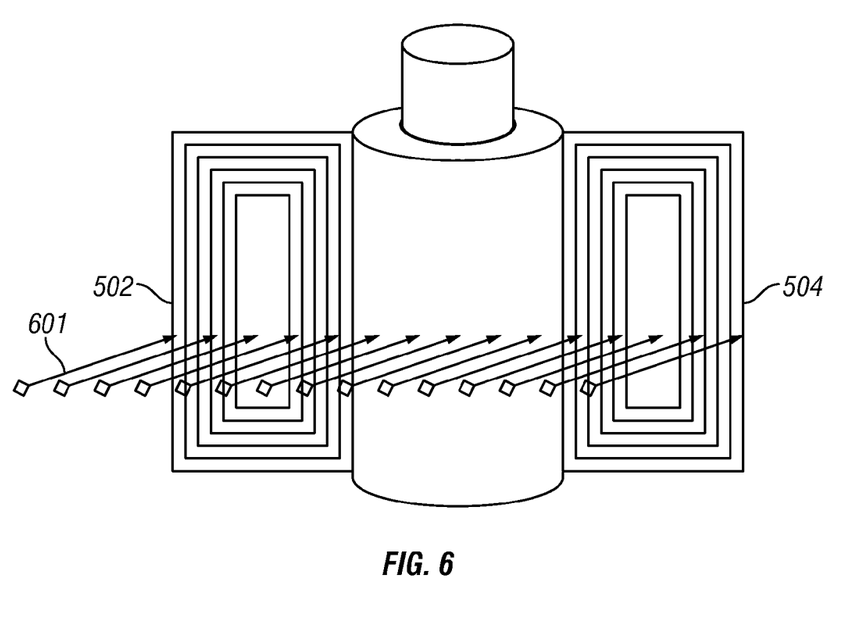
FIG. 6 illustrates the exemplary embodiment of FIG. 5 in the presence of an external magnetic field.

FIG. 6 illustrates the exemplary embodiment of FIG. 5 in the presence of an external magnetic field 601. A typical external magnetic field 601 may result from a transmitter coil (not shown) located at an axially-distant location of the tool member. Since the magnetic field 601 generally intercepts the plane of the coils 502 and 504 from the same direction, the current that arises in the coils circulate in the same direction. The magnetic field of the tool and the external magnetic field can thus be distinguished from each other using the difference or sameness in the direction of current flow in each of coils 502 and 504. For example, the two coils 502 and 504 can be connected in a way so as to form a single coil to reduce an effect of the magnetic field of the tool.

Figure 7:
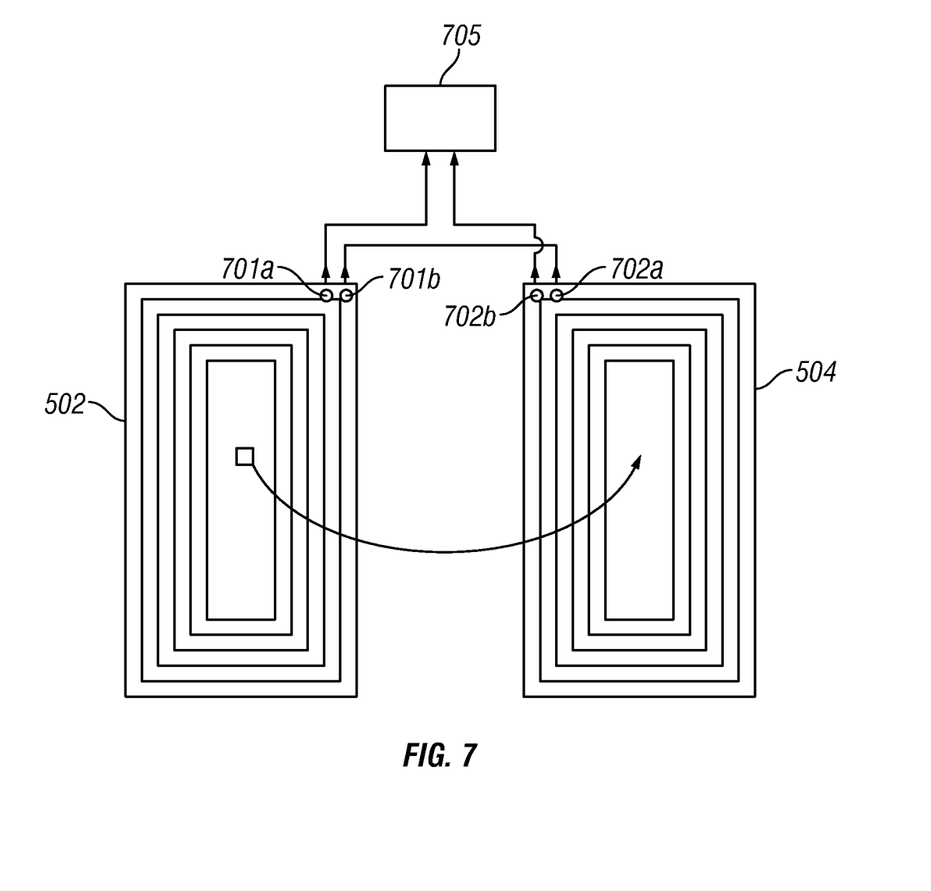
FIG. 7 shows a cross-wiring of coils to reduce an effect of an internally-produced magnetic field of the tool member.

FIG. 7 shows a cross-wiring of coils to reduce an effect of an internally-produced magnetic field of the tool member. Turns in each of coil segments 502 and 504 are arranged so as to display minor symmetry with respect to the longitudinal axis of the tool member. Coils 502 and 504 terminate at nodes 701a,b and 702a,b, respectively. Node 701b of coil 502 is electrically connected to node 702a of coil 504. In the presence of the internally-produced magnetic field resulting from the currents in the feed-through pipe, voltages measured from node 701a to node 701b are equal to and have the same sign as the voltages measured from node 702a to node 702b. Therefore, connecting the two segments in the manner shown in enables the voltages produced in two segments by the feed-through magnetic field to combine to provide a substantially zero reading as indicated at 705.

Figure 8:
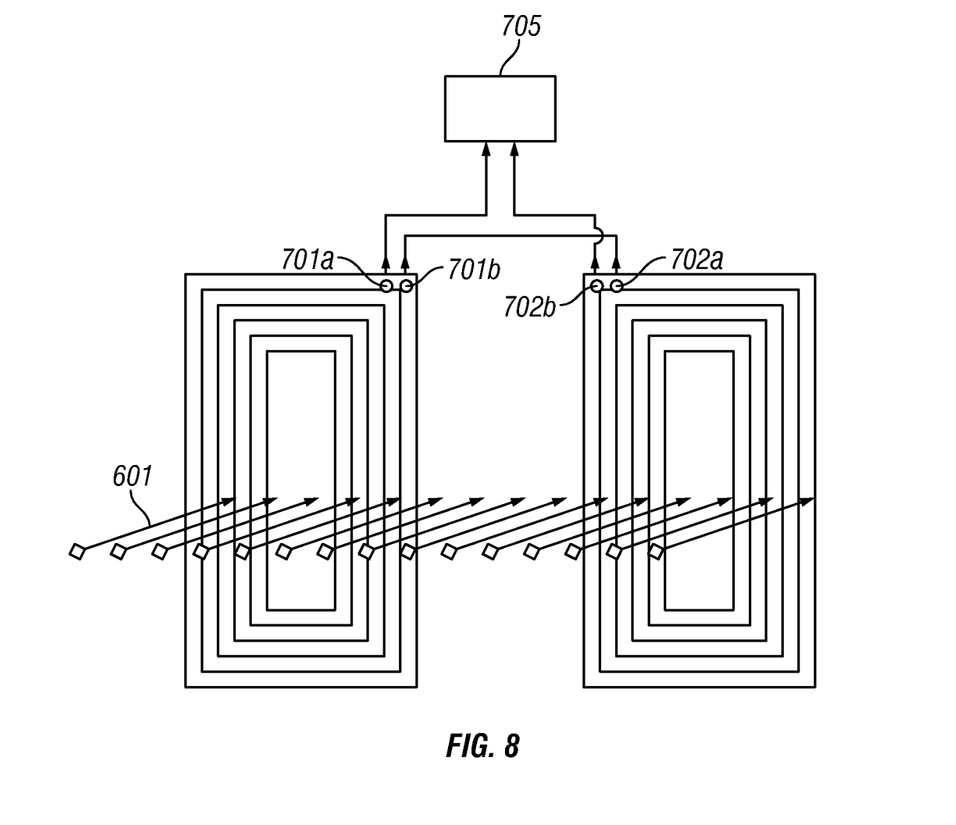
FIG. 8 shows the embodiment of FIG. 7 in the presence of an exemplary external magnetic field.

FIG. 8 shows the embodiment of FIG. 7 in the presence of an exemplary external magnetic field. In the presence of the external magnetic field 601, voltages measured from node 701a to node 701b are equal to and have the opposite sign as the voltages measured from node 702a to node 702b. Thus, the voltages generated at each coil add together at 705 to create double the voltage generated in each segment by the measured magnetic field.

The influence of the current flowing in the pipe may be further reduced by one of two methods. In the first method, the positions of the wing coils 502, 504 may be adjusted so that the center of one of the coils 502 is at a different radial distance from the center of the tool than the center of the other coil 504. This adjustment may be made with the tool outside the borehole on a test bench. In the second method, the relative gains of the preamplifiers of the two coils are adjusted so that a zero reading is obtained with a current flowing in the pipe 508 and the transmitters turned off. If the current flowing in the feed-through pipe is the major source of internal magnetic field than the signal of the currents may be dynamically calibrated out while the tool is operated in the borehole. To achieve the calibration, one need to switch all the transmitters off and perform adjustment of the gains.

Figure 9:
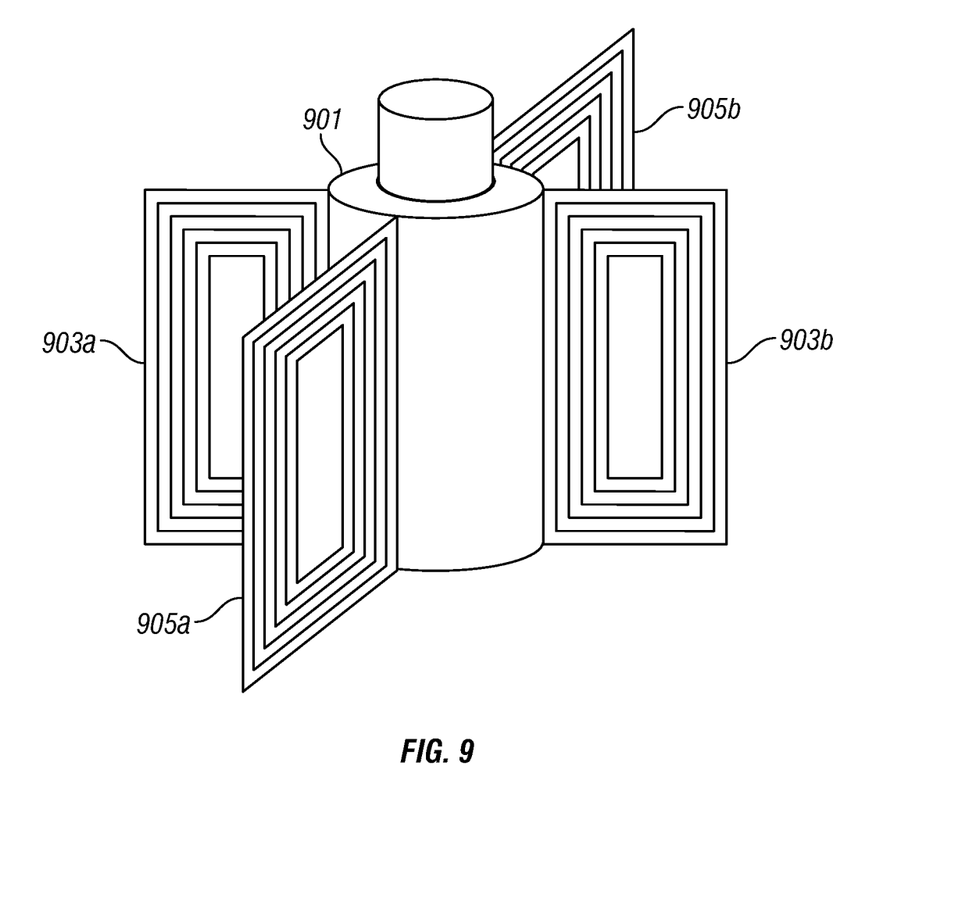
FIG. 9 illustrates an exemplary multi-component resistivity logging tool assembly having tri-axial co-located coils.

FIG. 9 illustrates an exemplary multi-component resistivity logging tool assembly having tri-axial co-located coils. The coils may be either transmitter coils or receiver coils. The assembly includes two longitudinally-oriented coils 901 and 902 (they are symmetrically positioned with respect to the center of the assembly) and two pairs of transversely-oriented segmented coils: 903a, 903b and 905a, 905b. The normal of the coils 901 and 902 is oriented along and defines a z-direction (the longitudinal direction of the tool member). Coils 903a,b and 905a,b define x- and y-directions, respectively.

The antennas shown in FIG. 9 may be referred to as a first antenna arrangement. The antennas 903a and 903b may be referred to as a first antenna and a second antenna respectively, while antenna 903a, 903b may be referred to as a first additional antenna and a second additional antenna respectively. Multi-component measurements may be obtained using a logging tool that includes two antenna assemblies (first antenna assembly and a second antenna assembly) of the type illustrated in FIG. 9. One of the assemblies may be used for transmitting electromagnetic signals into the earth formation and the second assembly, spaced apart from the first assembly, may be used to receive signals responsive to the generated electromagnetic signals. Since the different antenna components are collocated in both of the assemblies, the problems of the prior art logging tool of FIG. 2 caused by different transmitter-receiver distances for the different components are avoided.

Any of the configurations discussed above may be used for obtaining azimuthally sensitive measurements with a nonrotating tool. In particular, the design of FIG. 9 provides the ability to combine signals from the two pairs of planar coils with a suitable phase difference so as to "beam steer" the antennas in a selected azimuthal direction. This may, for example, be done with wireline logging. It may also be done when tripping out of the hole with the sensors on the BHA.

It should be noted that while the disclosure has been made using a wireline tool as an example, this is not to be construed as a limitation. The logging tool may be conveyed on a slickline or it may be part of a bottomhole assembly conveyed on a drilling tubular.

The operation of the transmitters and receivers, and the control of the drilling direction may be controlled by the downhole processor and/or a surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks. The term "processor" as used herein is intended to include Field Programmable Gate Arrays (FPGAs). Results of the processing may be stored on a suitable medium.

While the foregoing disclosure is directed to the exemplary embodiments of the disclosure, various modifications will be apparent to those skilled in the art. It is intended that all such variations within the scope of the appended claims be embraced by the foregoing disclosure.

What is claimed is:

1. An apparatus for estimating a value of a resistivity property of an earth formation, the apparatus comprising:
   a first antenna arrangement on a logging tool configured to be conveyed in a borehole, the first antenna arrangement including a first antenna and a second antenna disposed on opposite sides of the logging tool, the second antenna electrically coupled to the first antenna to suppress a first signal in the first antenna caused by an axially flowing current in a conductor inside the tool; and
   a processor configured to estimate the value of the resistivity property of the earth formation using a second signal in the first antenna and the second antenna responsive to an external magnetic field.

2. The apparatus of claim 1 wherein the external magnetic field is produced by a transmitter antenna having a longitudinally oriented axis axially spaced apart from the first antenna arrangement.

3. The apparatus of claim 2 wherein the first antenna arrangement further comprises an additional first antenna and an additional second antenna having axes in a plane substantially orthogonal to the longitudinally oriented axis and substantially orthogonal to a plane of the first antenna, and wherein the processor is further configured to use an output of the additional first antenna and the additional second antenna to estimate the value of the resistivity property.

4. The apparatus of claim 1 wherein the first antenna is at a first radial distance from a center of the logging tool and the second antenna is at a second radial distance different from the first distance from the center of the logging tool.

5. The apparatus of claim 3 wherein the first antenna arrangement further comprises an antenna oriented along the longitudinal axis and collocated with the first antenna and the second antenna.

6. The apparatus of claim 1 wherein an output of the first antenna is provided to a preamplifier having a first gain and wherein an output of the second antenna is provided to a preamplifier having a second gain different from the first gain.

7. The apparatus of claim 1 wherein the external magnetic field is produced by a second antenna arrangement axially spaced apart from the antenna arrangement, the second antenna arrangement including:
three orthogonal collocated antennas.

8. The apparatus of claim 1 wherein the processor is further configured to estimate at least one of: (i) a horizontal resistivity property, (ii) a vertical resistivity property, (iii) a relative dip angle, (iv) a relative strike angle, (v) a sand content of the formation, (vi) a shale content of the formation, and (vii) a water saturation of the formation.

9. The apparatus of claim 3 wherein the processor is further configured to beam-steer the produced signal from the first antenna and the produced signal from the second antenna relative to an output of the first additional antenna and the second additional antenna by applying a phase shift.

10. The apparatus of claim 1 further comprising a conveyance device configured to convey the logging tool into the borehole, the conveyance device being selected from: (i) a wireline, (ii) a bottomhole assembly conveyed on a drilling tubular, and (iii) a slickline.

11. The apparatus of claim 1, wherein the axially flowing current in the conductor inside the tool produces another magnetic field having a circumferential component, and the circumferential component causes the first signal.

12. The apparatus of claim 11, wherein the first antenna and a second antenna are connected to effectuate a single coil resulting in suppression of the first signal.

13. The apparatus of claim 11, wherein the second antenna is coupled to the first antenna such that a voltage over the first antenna caused by the axially flowing current combined with a voltage over the second antenna caused by the axially flowing current is substantially zero.

14. The apparatus of claim 1, wherein the first antenna has axes in a first plane and comprises a first coil, and a second antenna comprises a second coil laterally spaced from the first coil and substantially within the first plane.

15. The apparatus of claim 14, wherein the first coil and the second coil are configured such that a magnetic field oriented in a circumferential direction intercepts the first coil from an opposite direction than the second coil, thereby giving rise to a current in the first coil and a current in the second coil, wherein the current in the first coil circulates in the opposite direction of the current in the second coil.

16. A method of estimating a value of a resistivity property of an earth formation, the method comprising:
conveying a logging tool into a borehole;
using a first antenna arrangement on the logging tool including a first antenna and a second antenna on a side of the logging tool opposite to the first antenna, the second antenna electrically coupled to the first antenna for producing an output responsive to a first signal from an external magnetic field and suppressing a second signal in the first antenna caused by an axially flowing current in a conductor inside the tool; and
using a processor for estimating the value of the resistivity property of the earth formation using the produced output of the antenna arrangement.

17. The method of claim 16 further comprising producing the external magnetic field using a transmitter antenna having a longitudinally oriented axis.

18. The method of claim 17 further comprising:
using an additional first antenna and an additional second antenna having axes in a plane substantially orthogonal to the longitudinally oriented axis and substantially orthogonal to a plane of the first antenna for producing the response to the external magnetic field.

19. The method of claim 16 further comprising:
positioning the logging tool on a test bench prior to conveying the logging tool into the borehole,
with the logging tool in the test bench and a current flowing in the conductor, positioning the first antenna at a first radial distance from the center of the tool and positioning second antenna at a second radial distance from the center of the tool so as to make an output of the first antenna arrangement substantially zero.

20. The method of claim 16 further comprising:
positioning the logging tool in a test bench prior to conveying the logging tool into the borehole,
with the logging tool in the test bench and a current flowing in the conductor, adjusting a first gain of a preamplifier connected to the first antenna adjusting a gain of a second preamplifier connected to the second antenna so as to make an output of the antenna arrangement substantially zero.

21. The method of claim 16 further comprising cancellation of an effect of the conductor while the logging tool is operated in the borehole by means of:
switching all the transmitters off while the logging tool is in the borehole,
generating current in the conductor,
with the logging tool in the borehole and a current flowing in the conductor, adjusting a first gain of a preamplifier connected to the first antenna adjusting a gain of a second preamplifier connected to the second antenna so as to make an output of the antenna arrangement substantially zero.

22. The method of claim 16 further comprising producing the external magnetic field by an additional antenna arrangement axially spaced apart from the antenna arrangement, the additional antenna arrangement comprising three orthogonal collocated antennas.

23. The method of claim 16 further comprising using the processor to estimate at least one of: (i) a horizontal resistivity property, (ii) a vertical resistivity property, (iii) a relative dip angle, (iv) a relative strike angle, (v) a sand content of the formation, (vi) a shale content of the formation, and (vii) a water saturation of the formation.

* * * * *